R. HUFF.
MOTOR VEHICLE TRANSMISSION MECHANISM.
APPLICATION FILED JULY 27, 1910.
1,122,120.
Patented Dec. 22, 1914.
5 SHEETS—SHEET 3.
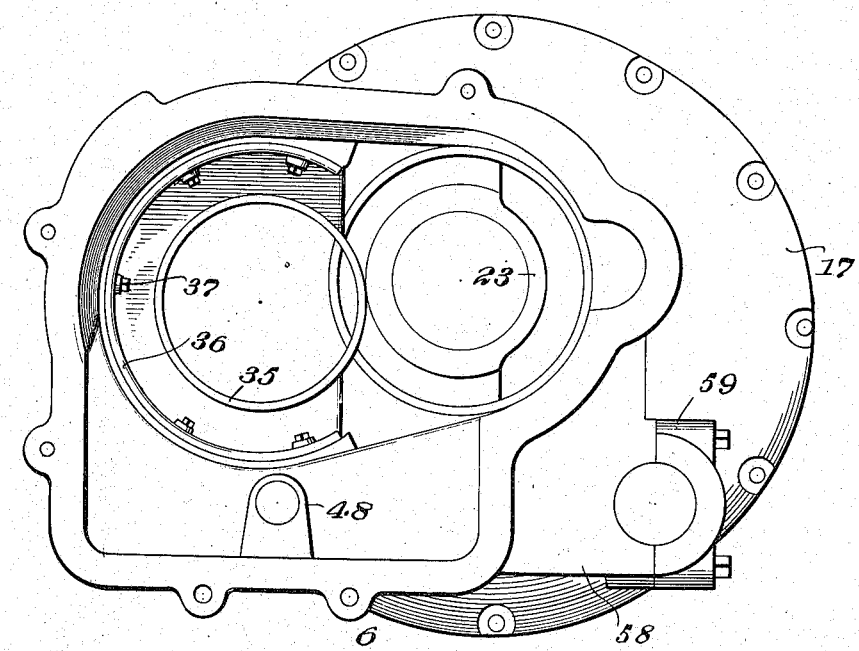
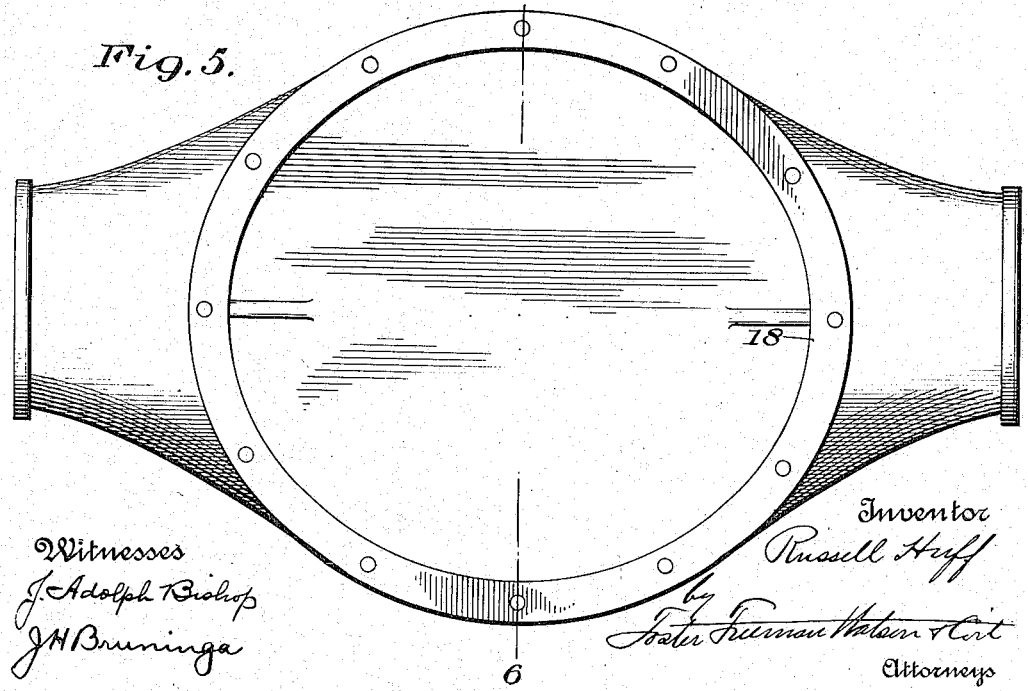

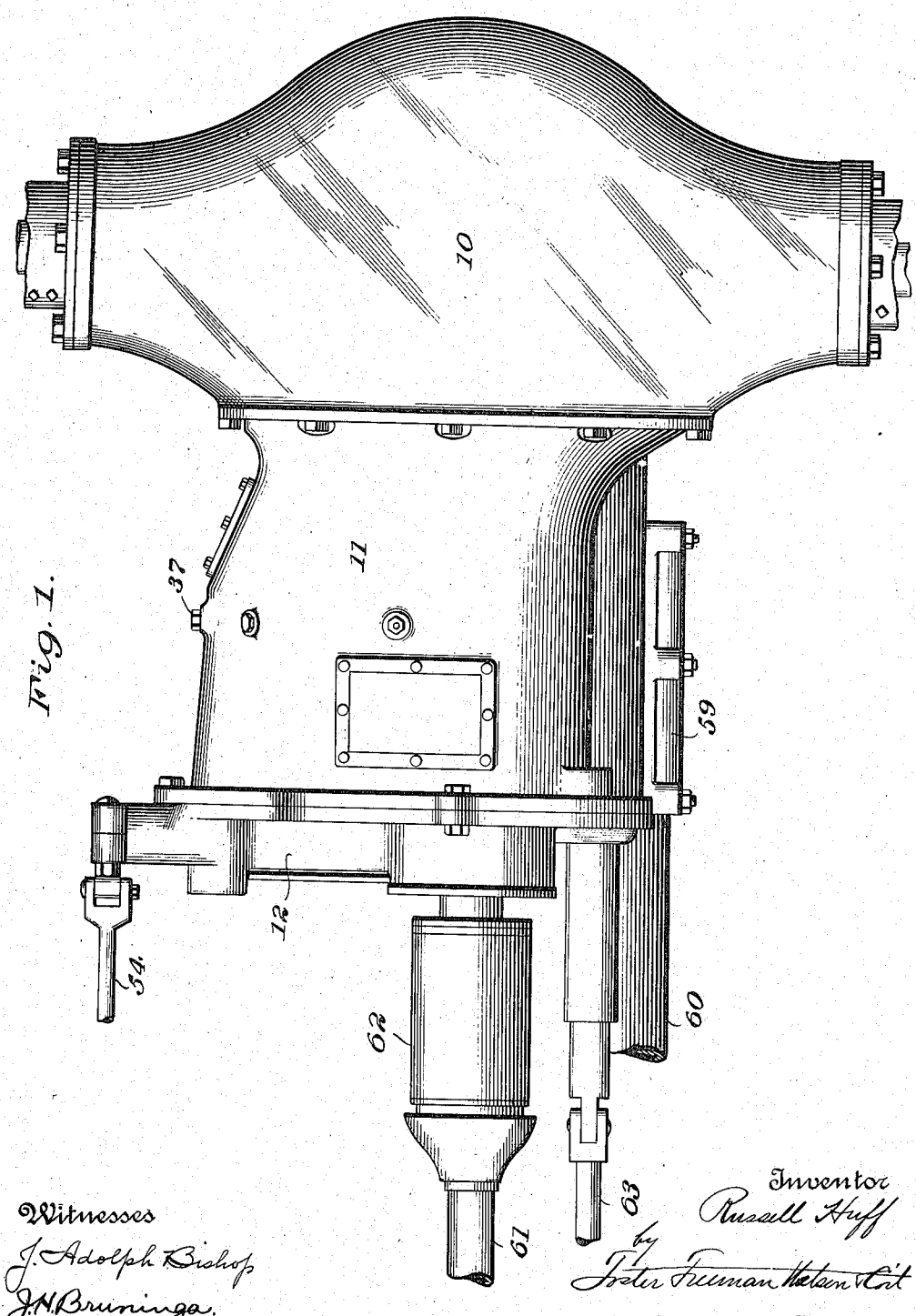

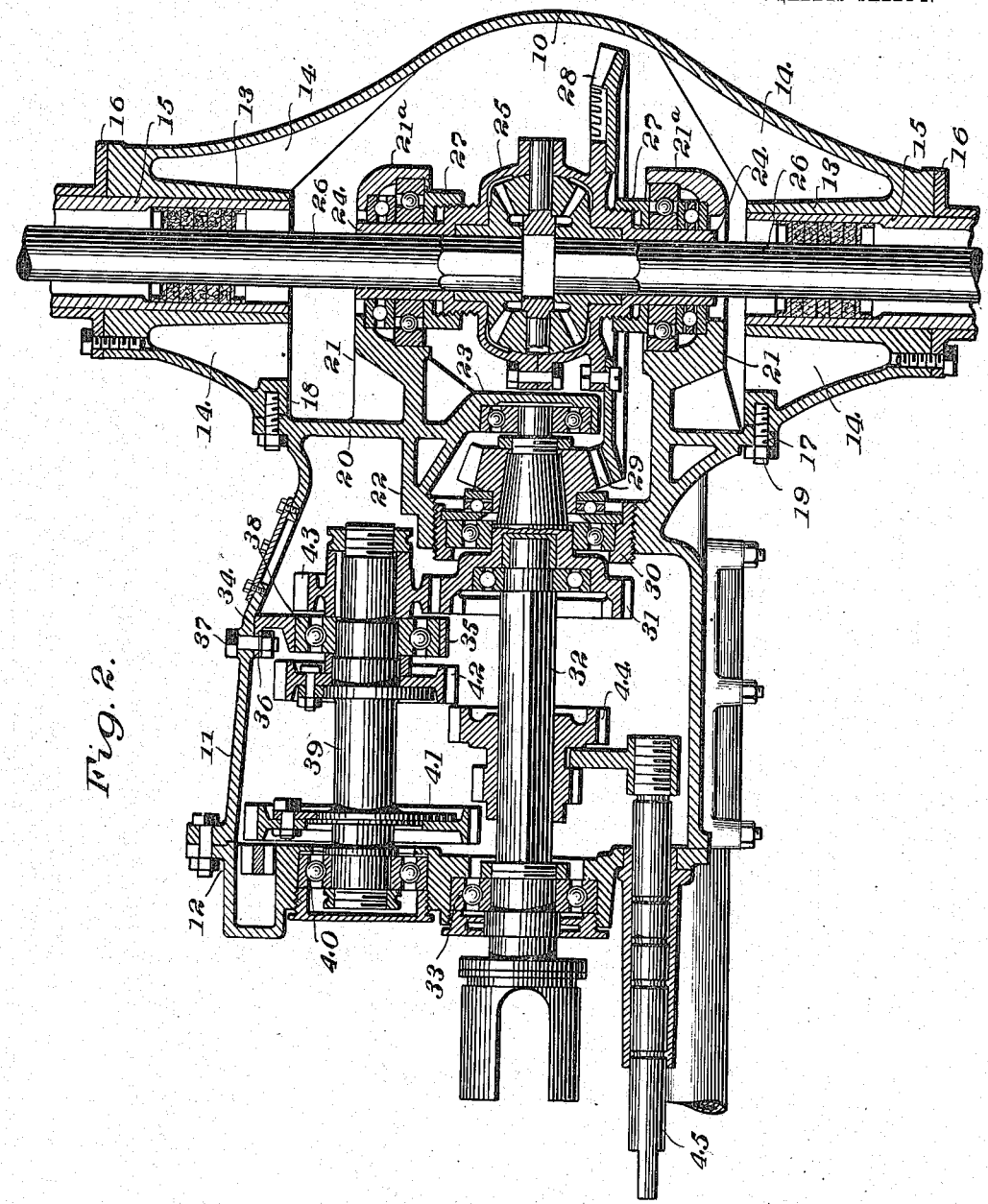

R. HUFF.
MOTOR VEHICLE TRANSMISSION MECHANISM.
APPLICATION FILED JULY 27, 1910.

1,122,120.

Patented Dec. 22, 1914.
5 SHEETS—SHEET 4.

Witnesses
J. Adolph Bishop
J. H. Bruninga

Inventor
Russell Huff
by Foster Freeman Watson & Coit
Attorneys

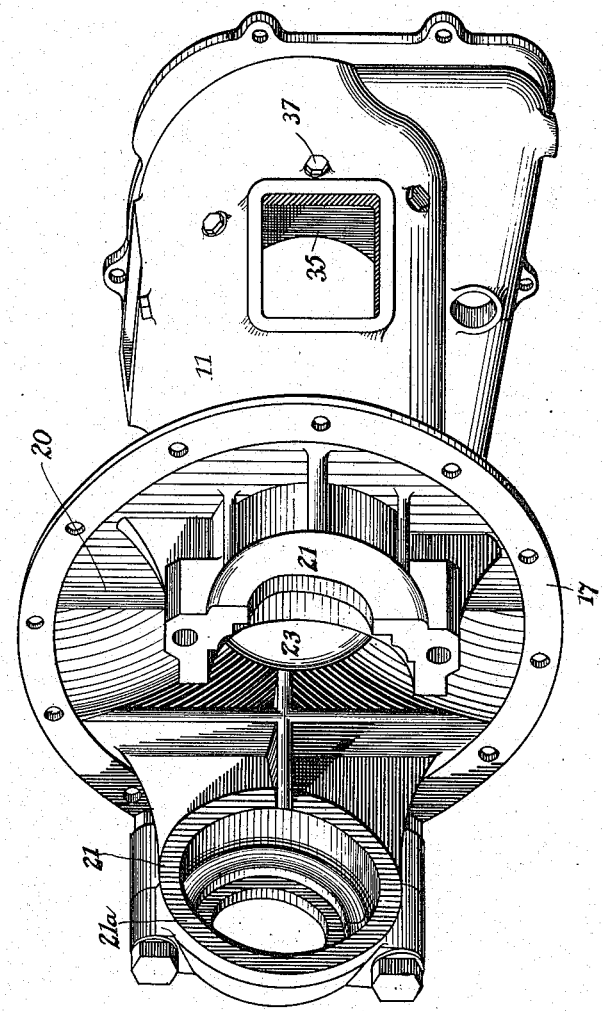

UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE TRANSMISSION MECHANISM.

1,122,120.

Specification of Letters Patent. Patented Dec. 22, 1914.

Application filed July 27, 1910. Serial No. 574,199.

*To all whom it may concern:*

Be it known that I, RUSSELL HUFF, a citizen of the United States, and resident of Detroit, Wayne county, State of Michigan, have invented certain new and useful Improvements in Motor-Vehicle Transmission Mechanism, of which the following is a specification.

This invention relates to transmission mechanisms for motor vehicles, and in particular to that type in which the change speed and differential mechanisms are inclosed in a single or connected casings.

One of the objects of this invention is to simplify the construction of this type of mechanism.

Another object is to construct the mechanism so that the change speed and differential mechanisms may be attached to and removed from the vehicle as a unit, so that all adjustments, etc., may be made while the mechanism is removed from the vehicle and on the bench.

Another object is to so construct the connections to the casings that they may be readily broken to facilitate the easy removal and replacement of the transmission mechanism.

Another object is to construct the casing and the bearings for the gears so that the mechanism may be easily removed from its casing.

Another object is to construct the differential casing so as to permit a maximum clearance with maximum size of the driven bevel gear, and to construct this casing so that it is simple in construction and cheap to manufacture.

Further objects will appear from the detail description taken in connection with the accompanying drawings, in which—

Figure 4:
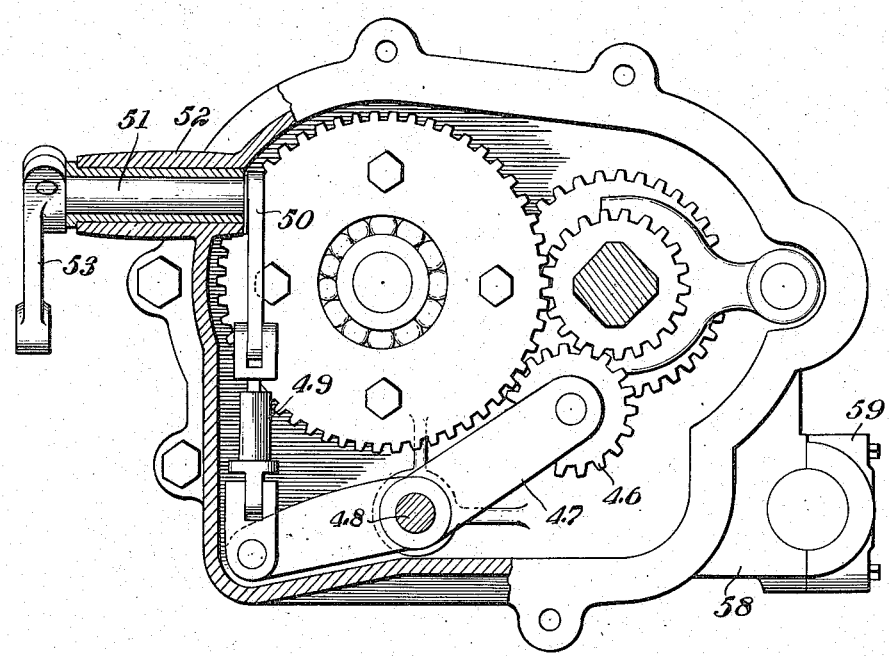
Figure 6:
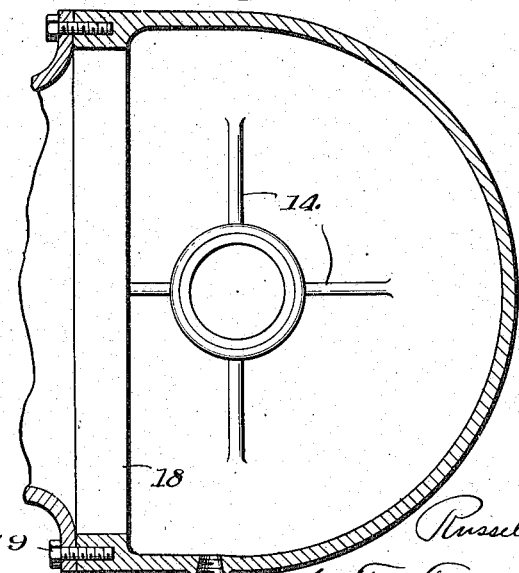

Figure 1 is a plan view of the transmission mechanism; Fig. 2 is a longitudinal horizontal section through the mechanism shown in Fig. 1; Fig. 3 is an end view of the change speed casing with the front cover removed; Fig. 4 is a view similar to Fig. 3 with the gearing in place and a part of the cover shown in section; Fig. 5 is a front view of the differential casing; Fig. 6 is a section on the line 6—6, Fig. 5; and Fig. 7 is a perspective view of the change speed casing.

Referring to the drawings, 10 designates the differential casing, 11 the change speed casing bolted thereto, and 12 the end cover plate for the change speed casing.

The differential casing is preferably integral throughout, and is preferably cast of some light material as aluminum. It has its greatest diameter at the center and tapers toward the ends as shown, and the ends are provided with inwardly extending sleeves 13 connected by strengthening webs 14 to the casing walls. The sleeves 13 are bored to receive the axle casings 15 which are further secured to the differential casing by means of flanges 16, which are rigidly secured to the axle casings by a pressed fit or the like, and to the differential casing by means of bolts as shown.

The change speed casing 11 is provided with a flange 17, and the differential casing is provided with a coöperating inwardly extending flange 18, and these casings are secured together by bolts 19 passing through the flange 17 and into the flange 18 as shown in the drawings. The change speed casing is provided with an integral end wall 20 which has formed integral therewith a pair of spaced bearing lugs 21, 21, extending outwardly from the wall, a bearing lug 22 extending inwardly, and another bearing lug 23 located between the spaced bearing lugs 21. The bearing lugs 21 are preferably provided with removable caps 21ª which are bolted to the bodies of the lugs 21, and these bearing lugs are arranged to receive antifriction bearings for supporting the hubs 24 of a differential mechanism 25. The differential mechanism is arranged to be connected with the axles 26 which are constructed to be removed axially therefrom, and the differential mechanism is arranged to be adjusted transversely, that is, longitudinally of the axles, by means of adjusting sleeves 27 which are adapted to be locked in place by suitable locking means not shown.

The differential mechanism 25 has bolted to it a driven bevel gear 28 which meshes with a driving bevel gear 29, supported at one end by an antifriction bearing in the bearing lug 23, and at the other end by antifriction bearings in a sleeve 30, which is adjustable in the bearing lug 22 as shown.

This construction of the bevel gears permits their adjustment relatively to each other in transverse directions so as to permit the mesh of the bevel gears to be closely adjusted. The sleeve 30, like the adjusting sleeves 27, is arranged to be locked in adjusted position by a suitable locking device.

The shaft for the driving bevel gear 29 has mounted upon it or formed integral therewith, a gear 31 provided both with external and internal teeth. This gear has mounted therein an anti-friction bearing which is arranged to support one end of an angular driving shaft 32, the other end of which is supported in an anti-friction bearing 33 in the end or cover plate 12. The casing 11 is machined as at 34, so as to form a finished bearing face for a ring 35. This ring is secured to the casing by means of bolts 37 passing through the casing and through a flange 36 on the ring. The ring is constructed to receive and support an antifriction bearing 38, which supports one end of a shaft 39, the other end being supported by an antifriction bearing 40 in the end plate 12. The shaft 39 has mounted thereon, gears 41, 42, and 43, the gears 42 and 43 being mounted on opposite sides of the bearing 38 and its supporting ring 35, and the internal diameter of the ring being slightly greater than the external diameter of the gear 43, so that this gear may be removed axially with its shaft through the ring.

The shaft 32 has slidingly mounted thereon a sleeve 44, provided with gears which are arranged to mesh with gears 41, 42, and to clutch with the internal teeth in the gear 31, so as to drive the bevel gear 29 at three different speed forward. This sliding sleeve 44 is arranged to be shifted longitudinally of the shaft 32 by means of a shifter rod 45, and a fork thereon.

A gear 46 is mounted at one end of a lever 47 which is pivoted in a bearing lug 48 in the casing 11, and in another bearing in the cover 12. The other end of the lever is connected by means of a link 49, and an arm 50 to a shaft 51 which is mounted in a bearing lug 52 on the cover. This shaft has mounted upon it an arm 53 to which is connected a link 54 which extends forwardly to a control lever. The gear 46 is a wide gear, and is constructed to mesh with the gear 41, and the smaller of the gears on the sleeve 44 when this sleeve is in the position shown in Fig. 2. By means of this train of mechanism, the shaft 32 is arranged to drive the driving bevel gear 29 in a reverse direction.

The casing 11 has formed thereon a lug 58 to which is bolted a cap 59 which is arranged to receive the usual torsion rod 60. The driving shaft 32 is connected to a propeller shaft 61 by means of a universal joint 62, and the shifting rod 45 has a detachable connection with a link 63 extending to a controlling lever.

It will be seen that the entire change speed and differential mechanism is mounted upon a single support, namely, the casing 11 so as to form a unit therewith and so as to be removable therewith. The power transmitting, the controlling, and the supporting connections to the change speed casing consisting of the propeller shaft, gear controlling links 54 and 63 and torsion rod 60, can all be broken, and by then removing the axles from the differential mechanism, and unbolting the change speed casing from the differential casing, the entire change speed mechanism can be removed from the vehicle as a unit. This is exceedingly advantageous since it permits all of the adjustments, etc., between the change speed gears as well as the bevel gears to be made while the mechanism is in the assembly room or on the bench. The adjustments, etc., can be of course more satisfactorily and expeditiously accomplished in the assembly room since the space is not so crowded as when the mechanism is in place on the vehicle.

It is desirable to construct the driven bevel gear 28 of as large a diameter as possible in order that the driving bevel gear may be of a large diameter, at the same time keeping the ratio large enough so that a comparatively high speed motor may be used without resorting to a constant reduction in the change speed casing and thereby necessarily cutting out the desirable direct drive. On the other hand, by increasing the size of the driven bevel gear a difficulty is encountered which necessarily limits its external diameter. This is road clearance, which must be as great as possible especially in the center of the car. The aperture in the differential casing must of course be large enough so as to permit the insertion in and removal from the same of the driving bevel gear which necessarily is large. The differential casing must also be provided with a flange into which the fastenings can pass. In accordance with this invention a maximum driven bevel gear diameter and a maximum clearance are obtained in the following manner. The flange 18 is constructed to extend inwardly so as to obviate the projection of the same outwardly from the differential casing. Now if the flange projects inwardly, the vertical diameter of the opening is necessarily narrow, so that it is less than the diameter of the bevel gear. In order therefore to permit the insertion of the bevel gear, the opening is made oblong with its longer axis or dimension horizontal, the longer dimension being greater than the diameter of the bevel gear so that the bevel gear may be placed in position in the casing by inserting the same in a horizontal position into the differential casing and then turning the same in a vertical position. By means of this construction, the clearance and the driven bevel gear diameter may be made a maximum.

The ring 35 forms a support which is close to both of the gears 42 and 43. This forms a rigid bearing which prevents springing of the shafts and the gears thereon, and thus reduces vibration and noise considerably. The shaft 39 and its gears may be easily removed from the casing by unbolting the cover 12 and removing the shaft and its gears endwise, the gear 43 clearing the larger opening in the ring 35. The driving bevel gear 29, its shaft and the gear 31 may also be removed endwise by unscrewing the sleeve 30 from its bearing lug 22, and removing the ring 35. It will thus be seen that the casing and the bearings therein are so constructed that all of the gears may be removed therethrough endwise by unbolting the cover 12.

It is obvious that various changes may be made in the details of construction without departing from this invention, and it is therefore, to be understood that this invention is not to be limited to the specific construction shown and described.

Having thus described the invention, what is claimed is:

1. In a transmission mechanism for motor vehicles, the combination with change speed and differential mechanism, of separable casings inclosing said mechanism, and bearing supports for said differential mechanism integral with said change speed mechanism casing.

2. In a transmission mechanism for motor vehicles, the combination with change speed and differential mechanism, of separable casings inclosing said mechanism, and bearing supports for said differential mechanism integral with said change speed mechanism casing, and a detachable end cover for said casing.

3. In a transmission mechanism for motor vehicles, the combination with change speed and differential mechanism including driving and driven bevel gears, of separable casings inclosing said change speed and differential mechanism, and bearing supports for said bevel gears integral with said change speed mechanism casing.

4. In a transmission mechanism for motor vehicles, the combination with change speed and differential mechanism, of a casing for said differential mechanism, and a casing inclosing said change speed mechanism adapted to be secured to said differential casing and provided with integral bearing lugs for said differential mechanism.

5. In a transmission mechanism for motor vehicles, the combination with change speed and differential mechanism, of a casing for said differential mechanism having a front opening, a casing inclosing said change speed mechanism and provided with integral bearing lugs for said differential mechanism, and means for securing said change speed casing to said differential casing with the differential mechanism in position in its casing.

6. In a transmission mechanism for motor vehicles, the combination with change speed and differential mechanism, of a casing for said differential mechanism, a casing inclosing said change speed mechanism and adapted to be secured thereto and provided with integral bearing lugs for said differential mechanism, and driven shafts extending into said differential casing and having a detachable connection with said differential mechanism.

7. In a transmission mechanism for motor vehicles, the combination with change speed and differential mechanism, of a casing inclosing said change speed mechanism and having an integral end wall, and bearing lugs for said differential mechanism projecting from said wall.

8. In a transmission mechanism for motor vehicles, the combination with change speed and differential mechanism, of a casing inclosing said change speed mechanism and having an integral end wall, bearing lugs for said differential mechanism projecting from said wall, and a detachable end wall for the other end of the casing.

9. In a transmission mechanism for motor vehicles, the combination with change speed and differential mechanism including driving and driven bevel gears, of a casing inclosing said change speed mechanism and having an integral end wall, and bearings on said wall for one of said bevel gears.

10. In a transmission mechanism for motor vehicles, the combination with change speed and differential mechanism including driving and driven bevel gears, of a casing inclosing said change speed mechanism and having an integral end wall, and bearings on said wall for both of said bevel gears.

11. In a transmission mechanism for motor vehicles, the combination with change speed and differential mechanism including driving and driven bevel gears, of a casing inclosing said change speed mechanism and having an integral end wall, and bearing lugs projecting from said wall for said driven bevel gear.

12. In a transmission mechanism for motor vehicles, the combination with change speed and differential mechanism including driving and driven bevel gears, of a casing inclosing said change speed mechanism and having an integral end wall, a bearing lug on said wall for the driving bevel gear, and bearing lugs projecting from said wall for the driven bevel gear.

13. In a transmission mechanism for motor vehicles, a gear casing having an integral end wall, and a pair of spaced bearing lugs projecting therefrom.

14. In a transmission mechanism for motor vehicles, a gear casing having an integral end wall, a pair of spaced bearing lugs projecting outwardly therefrom, and a removable end wall for the other end of the casing.

15. In a transmission mechanism for motor vehicles, the combination with change speed and differential mechanism including driving and driven bevel gears, of a casing inclosing said change speed mechanism and having an integral end wall, and bearings for said bevel gears integral with said wall.

16. In a transmission mechanism for motor vehicles, the combination with change speed and differential mechanism including driving and driven bevel gears, of a casing inclosing said change speed mechanism and having an integral end wall, bearings in said wall for one of said bevel gears, and a detachable end wall for the other end of said casing, whereby said gearing may be removed therethrough endwise.

17. In a transmission mechanism for motor vehicles, the combination with change speed and differential mechanism, of a casing inclosing said change speed mechanism and having an integral end wall, a detachable wall for the other end of the casing, bearings for said change speed mechanism supported by said end walls, and bearings for said differential mechanism supported by said integral end wall.

18. In a transmission mechanism for motor vehicles, the combination with a change speed gearing and a differential mechanism, of a casing surrounding the change speed gearing, a detachable cover at one end of the casing, bearings for the change speed gearing in the casing and cover, and bearings for the differential mechanism in an integral extension of the casing.

19. In a transmission mechanism for motor vehicles, the combination with a change speed gearing and a differential mechanism, of a casing surrounding the change speed gearing, a detachable cover at one end of the casing, bearings for the change speed gearing in the casing and cover, bearings for the differential mechanism in an integral extension of the casing, and a casing surrounding the differential mechanism and connected with the first casing.

20. In a transmission mechanism for motor vehicles, the combination with driving and driven gears, of a support for said gears, a casing adapted to receive said driven gear vertically therein and having an oblong opening therein through which said driven gear is adapted to pass, and means for securing said support to said casing.

21. In a transmission mechanism for motor vehicles, the combination with driving and driven gears, of a support for said gears, a casing adapted to receive said driven gear vertically therein and having an oblong opening therein with its long axis horizontal through which said driven gear is adapted to pass, and means for securing said support to said casing.

22. In a transmission mechanism for motor vehicles, the combination with driving and driven bevel gears, of a support for said gears having a pair of bearing lugs for said driven gear thereon, a casing adapted to receive said driven gear vertically therein and having an oblong opening therein with its long axis horizontal through which said driven gear and its bearing lugs are adapted to pass, and means for detachably securing said support to said casing.

23. In a transmission mechanism for motor vehicles, the combination of a casing having an opening of greater diameter horizontally than vertically, of a differential gearing adapted to be housed in said casing with its bevel gear in a vertical plane, said bevel gear being larger than the vertical diameter of said opening but smaller than the horizontal diameter thereof, and said casings permitting the differential gearing to be turned while in said casing to remove it through said opening.

24. In a transmission mechanism for motor vehicles, the combination with a rear axle casing, having an oblong opening therein with its longer axis horizontal, of a driven gear adapted to be passed into said casing through said opening, and to be located vertically therein.

25. In a transmission mechanism for motor vehicles, the combination with a casing having an oblong opening therein with its longer axis horizontal, of a gear of larger diameter than the short axis of said opening but of smaller diameter than the long axis, said gear being adapted to be passed through said opening and arranged vertically in said casing.

26. In a transmission mechanism for motor vehicles, a differential casing comprising a single integral structure having integral sleeves projecting inwardly therein.

27. In a transmission mechanism for motor vehicles, the combination with a differential casing comprising a single integral structure having integral sleeves projecting inwardly therein, and axle tubes extending into said sleeves.

28. In a transmission mechanism for motor vehicles, the combination with a differential casing having integral sleeves projecting inwardly therein, of a support having bearing lugs for the differential projecting into said casing.

29. In a transmission mechanism for motor vehicles, the combination with a differential casing having integral sleeves projecting inwardly therein, of a change speed casing detachably secured to said differential casing.

30. In a transmission mechanism for motor vehicles, the combination with a differential casing having integral sleeves projecting inwardly therein, and having an opening therein, of a second casing detachably secured to said differential casing at said opening.

31. In a transmission mechanism for motor vehicles, the combination with a differtial casing having integral sleeves projecting inwardly therein, of a second casing detachably secured to said differential casing and having a pair of bearing lugs thereon projecting into said differential casing.

32. In a transmission mechanism for motor vehicles, the combination with a differtial casing having an inwardly projecting flange, of a support, and fastening means passing through said support and into said flange.

33. In a transmission mechanism for motor vehicles, the combination with a differential casing having an opening therein and an inwardly projecting flange at said opening, of means closing said opening, and fastenings securing said closing means to said flange.

34. In a transmission mechanism for motor vehicles, the combination with a differential casing having an oblong opening therein with the longer axis horizontal and an inwardly projecting flange at said opening, of a support adapted to be secured to said casing at said opening and to said flange, and a gear on said support adapted to be placed in said casing.

35. In a motor vehicle, the combination with change speed and differential mechanism, of a casing for said differential mechanism, a casing for said change speed mechanism detachably secured to said differential casing, bearings for said differential mechanism supported by and removable with said change speed casing, and detachable connections to said change speed casing extending forwardly thereof.

36. In a motor vehicle, the combination with change speed and differential mechanism, of a casing for said differential mechanism, a casing for said change speed mechanism detachably secured to said differential casing, bearings for said differential mechanism supported by and removable with said change speed casing, and detachable power transmitting and controlling connections extending forwardly of said change speed casing.

37. In a motor vehicle, the combination with change speed and differential mechanism, of a casing for said differential mechanism, a casing for said change speed mechanism detachably secured to said differential casing, bearings for said differential mechanism supported by and removable with said change speed casing, and detachable power transmitting, controlling, and supporting connections extending forwardly of said change speed casing.

38. In a motor vehicle, the combination with change speed and differential mechanism, of a casing for said differential mechanism having an opening at its forward side, a casing for said change speed mechanism, bearings for said differential mechanism supported by and removable with said change speed casing, said differential mechanism and casing being constructed to permit said differential mechanism to be inserted into and removed from said differential casing through said opening therein, means for detachably securing said change speed casing to said differential casing, and detachable connections to said change speed casing extending forwardly thereof.

39. In a motor vehicle, the combination with a bridge or axle casing having an opening in its forward side, of a change speed casing and gearing adapted to be detachably secured to the forward side of said axle casing, and a differential gearing mounted on said change speed casing adapted to be inserted rearwardly through said bridge opening and withdrawn forwardly therethrough, and housed by said bridge or axle casing while the change speed casing is secured in place, driving and gear controlling connections from the change speed casing to the forward part of the vehicle, and detachable couplings in said connections forward of the change speed casing adapted to permit the same to be withdrawn forwardly from the bridge.

40. In a transmission mechanism for motor vehicles, the combination with a casing, of alined driving and driven shafts mounted in said casing, a counter shaft, constantly meshing gears on the counter and one of the alined shafts, a second gear on the counter shaft, a sliding gear on the other alined shaft adapted to mesh with the second counter shaft gear, bearing supports for the countershaft at two points only and one of said supports being arranged between the gears thereon.

41. In a transmission mechanism for motor vehicles, in combination, a casing, parallel shafts in the casing, gears on each of said shafts, each of said shafts having bearing supports at two points only, a bearing for one of said shafts being arranged between two of the gears of that shaft.

42. In a transmission mechanism for motor vehicles, in combination, a casing, alined driving and driven shafts in said casing, a counter shaft, two gears on the counter shaft, a bearing for the counter shaft in the casing between said gears, and a sliding gear on one of the alined shafts having driving connections on either side of said bearing.

43. In a transmission mechanism for motor vehicles, in combination, a casing, alined driving and driven shafts in said casing, a counter shaft, two gears on the countershaft, a bearing support detachably secured in said casing between said gears and having a bearing seat of larger diameter than one of said gears, a bearing for the counter shaft in said support, and gears on the alined shafts adapted to mesh with the counter shaft gears.

44. In a transmission mechanism for motor vehicles, in combination, a casing, alined driving and driven shafts in said casing, a counter shaft, two gears on the countershaft, a bearing support detachably secured in said casing between said gears and having a bearing seat of larger diameter than one of said gears and smaller than the other of said gears, a bearing for the counter shaft in said support and adapted to be withdrawn therefrom with said counter shaft, and a sliding gear on one of the alined shafts adapted to mesh with the larger of the counter shaft gears and to move to a driving connection beyond said bearing.

45. In a transmission mechanism for motor vehicles, the combination with a differential casing having inwardly extending sleeves, of a detachable support having bearing lugs for the differential projecting into said casing between said sleeves.

46. In a transmission mechanism for motor vehicles, the combination with a differential casing having inwardly extending sleeves and having a transverse opening, of a support detachably secured to said casing for closing said opening and having bearing lugs for the differential arranged adjacent to and between the inner ends of said sleeves.

47. In a transmission mechanism for motor vehicles, the combination with a differential casing having inwardly extending sleeves and having a transverse opening, differential gearing having a bevel gear thereon, and a driving pinion for said bevel gear, of a detachable support secured to said casing over said opening and having bearings for said pinion and bearing lugs for the differential gearing projecting into the casing between said sleeves.

48. In a transmission mechanism for motor vehicles, in combination, a differential casing having an enlarged central part and tapering ends, tubes secured in said ends and extending inwardly toward the center of the casing, and a support having bearing lugs for the differential projecting into the casing between the inner ends of said tubes.

49. In a transmission mechanism for motor vehicles, in combination, a differential casing having an enlarged central part and tapering ends, said casing also having a transverse opening therein, tubes secured in said ends and extending inwardly toward the center of the casing, a differential mechanism, a driving pinion therefor, a support detachably secured to said casing at said opening and having bearings for said pinion and bearing lugs for said differential mechanism projecting into the casing between the inner ends of said tubes, and axially removable axle sections in said tubes extending into operative relation with said differential mechanism.

In testimony whereof I affix my signature in presence of two witnesses.

RUSSELL HUFF.

Witnesses:
C. I. DALE,
W. H. FINCKEL, Jr.